United States Patent [19]

Takada

[11] Patent Number: 4,684,221

[45] Date of Patent: Aug. 4, 1987

[54] GRADED REFRACTIVE INDEX SINGLE LENS SYSTEM

[75] Inventor: Katsuhiro Takada, Tokyo, Japan

[73] Assignee: Olympus Optical Co., Ltd., Tokyo, Japan

[21] Appl. No.: 818,607

[22] Filed: Jan. 13, 1986

[30] Foreign Application Priority Data

Jan. 16, 1985 [JP] Japan .................................. 60-3997

[51] Int. Cl.$^4$ .............................................. G02B 3/00
[52] U.S. Cl. .................................................. 350/413
[58] Field of Search ....................................... 350/413

[56] References Cited

U.S. PATENT DOCUMENTS 3,729,253  4/1973  Moore et al. ................. 350/413
4,457,590  7/1984  Moore ........................... 350/413

FOREIGN PATENT DOCUMENTS 55-6354  1/1980  Japan .
59-62815  4/1984  Japan .

Primary Examiner—John K. Corbin
Assistant Examiner—Rebecca D. Gass
Attorney, Agent, or Firm—Cushman, Darby & Cushman

[57] ABSTRACT

A graded refractive index (GRIN) single lens system comprises at least one surface formed spherically and has refractive index n expressed by the formula shown below wherein the higher order coefficients $h_8$ and $h_{10}$ of the refractive index distribution satisfy the following conditions (1) and (2) so that N.A. has the value of no less than 0.5 and various aberrations are well-corrected.

$$n^2 = n_0^2 [1 - (gr)^2 + h_4(gr)^4 + h_6(gr)^6 + h_8(gr)^8 + h_{10}(gr)^{10}]$$

$$-1.5 < 1/h_8 < 2 \quad (1)$$

$$-5 < h_{10} \quad (2).$$

15 Claims, 16 Drawing Figures

GRADED REFRACTIVE INDEX SINGLE LENS SYSTEM

BACKGROUND OF THE INVENTION (a) Field of the Invention

The present invention relates to a lens system using inhomogeneous material, especially a graded refractive index (GRIN) single lens system used as an objective lens system for optical video disks, etc.

(b) Description of the Prior Art

Recently there have developed apparatuses which read, by the converging of a laser beam to a microspot, the information which is recorded with high density on recording medium such as optical video disks, digital audio disks, etc.

In such apparatuses, it is necessary for an objective lens system used for the recording and the playing back of information to be compact and light because the objective lens system is driven directly for the purpose of autofocusing and auto-tracking. It is also necessary for the objective lens system to have a large N.A. in order to obtain a smaller spot size of a laser beam which is converged on a recording medium.

As such an objective lens system, a combination of a plurality of homogeneous spherical lenses or a single homogeneous aspherical lens, especially for the purposes of being compact and light, has hitherto been in use.

Moreover, besides these homogeneous lenses, a GRIN single lens system using inhomogeneous material for economy of manufacture, compactness, and light weight has been known recently.

In the early GRIN lens system, only the correction of spherical aberration was considered.

As is well known, it is necessary for an objective lens system used for optical video disks, etc. to have aberrations well-corrected in the range of diameters of 0.1–0.2 mm on the disk surface and, therefore, not only spherical aberration but also coma should be well-corrected.

There have been known the GRIN single lens systems the surface of which are suitably spherical, and the higher order coefficients of the refractive index distribution are arranged so that not only spherical aberration but also coma (sign condition) is corrected. They are, for example, disclosed in Japanese Published Unexamined Patent Application Nos. 122512/83 and 62815/84. In the former of these prior art references, the refractive index distribution is expressed by $$n = n_{00} + n_{10}r^2 + n_{20}r^4,$$

and both radii of curvatures of two refracting surfaces and the higher order coefficients $n_{10}$, $n_{20}$ of the refractive index distribution are arranged so that the coefficient of third order aberration becomes almost zero. In the latter thereof, the refractive index distribution is expressed by $$n^2 = n_0^2[1 - (gr)^2 + h_4(gr)^4 + h_6(gr)^6],$$

and both the radii of curvatures of two surfaces and the higher order coefficients $h_4$, $h_6$ are arranged so that spherical aberration and sign condition are corrected to be almost zero.

In the former of these two prior art references, the correction of aberrations does not reach the level of practical use, but in the latter thereof, aberrations are well-corrected to the level of practical use in view of aberrations.

However, in all the prior art, N.A. is 0.45 at most, which does not satisify the requirement of the N.A. being larger.

SUMMARY OF THE INVENTION

It is a primary object of the present invention to provide a graded refractive index (GRIN) single lens system wherein N.A. is no less than 0.5, though aberrations are well-corrected.

In the GRIN single lens system according to the present invention, the refractive index distribution is cylindrically symmetric to the optical axis and is expressed by the following formula:

$$n^2 = n_0^2[1 - (gr)^2 + h_4(gr)^4 + h_6(gr)^6 + h_8(gr)^8 + h_{10}(gr)^{10}]$$

where $n_0$ represents the refractive index on the optical axis of the lens, r represents the radial distance from the optical axis, g is the parameter representing the degree of gradient of the refractive index distribution, and, $h_4$, $h_6$, $h_8$ and $h_{10}$ respectively represent the higher order coefficients of the refractive index distribution.

The GRIN single lens system according to the present invention has the refractive index distribution as mentioned above, and the characteristics of the GRIN single lens system according to the present invention are that at least one surface thereof is formed spherically and the following conditions (1) and (2) are satisfied.

$$-1.5 < 1/h_8 < 2 \qquad (1)$$

$$-5 < h_{10} \qquad (2)$$

It is necessary for the objective lens system used for the recording and playing back of optical video disks, etc. to have aberrations well-corrected in the range of diameters 0.1–0.2 mm with the optical axis on the image surface as the center. For that purpose, the correction of only spherical aberration is not adequate, but it is necessary to take into account the correction of off-axial aberrations, mainly of sign condition and astigmatism.

In a GRIN single lens system having about 0.45 as N.A., only when the correction of spherical aberration and sign condition are taken into account, in almost all cases astigmatism is within the normal tolerance. However, the larger the N.A. becomes, the smaller the tolerance limits of astigmatism become, so that it is necessary for larger N.A. to take into account the correction of both astigmatism and sign conditon.

As for astigmatism of the above mentioned three aberrations to be corrected, in the objective lens system used for the recording and playing back of optical disks, etc., astigmatism is mostly determined by the shape of the lens, the refractive index $n_0$ on the optical axis of the lens and the parameter g representing the degree of gradient of the refractive index distribution, and is hardly affected by the higher order coefficients of the refractive index distribution. Therefore, once $n_0$ and g are given, astigmatism and sign condition will be corrected mainly by means of the shape of the lens, and residual spherical aberration can then be corrected with good balance to sign condition by means of the arrangement of the higher order coefficients of the refractive index distribution.

When only $h_4$, $h_6$ of the higher order coefficients of the refractive index distribution are adopted to be arranged, there will be limits in the correction of residual spherical aberration. Especially in the case where N.A. is increased, the solution is limited within the narrow region.

Therefore, when residual spherical aberration is corrected by means of the higher order coefficients up to $h_{10}$ of the refractive index distribution, it will be possible to enlarge the solution to the region where the correction could not hitherto have been possible. When the solution is sought in the narrow region, it will be possible to obtain the lens the spherical aberration of which is extremely well-corrected. In this case, it is necessary to select $h_8$ and $h_{10}$ within the limits of the above mentioned conditions (1) and (2).

If the values of $h_8$, $h_{10}$ under the conditons (1), (2) exceed the limits thereof, it will be difficult to correct spherical aberration, sign condition and astigmatism satisfactrily and with good balance.

DETAILED DESCRIPTION OF THE PREFERRED EMBODIMENTS

Preferred Embodiments of the GRIN lens system according to the present invention as described above are explained below.

Figure 1:
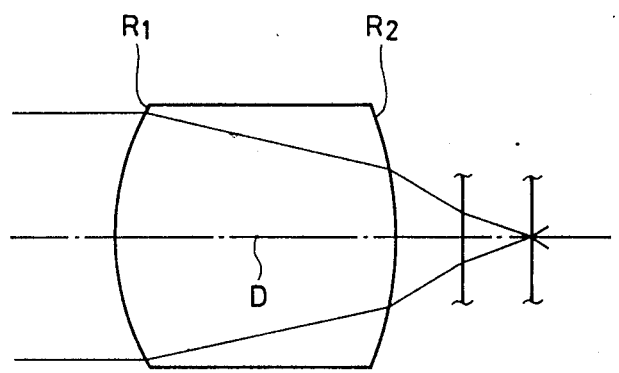
FIG. 1 shows a sectional view of Embodiments 1, 2, 3, 4, 7, 8, 9 and 14 of the GRIN single lens system according to the present invention.
Figure 2:
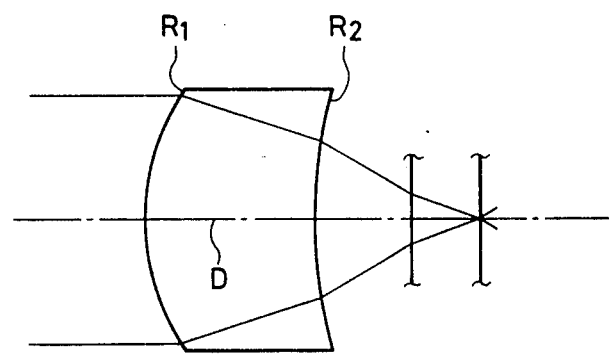
FIG. 2 shows a sectional view of Embodiments 5, 6, 10, 11, 12 and 13 of the GRIN single lens system according to the present invention.
Figure 3:
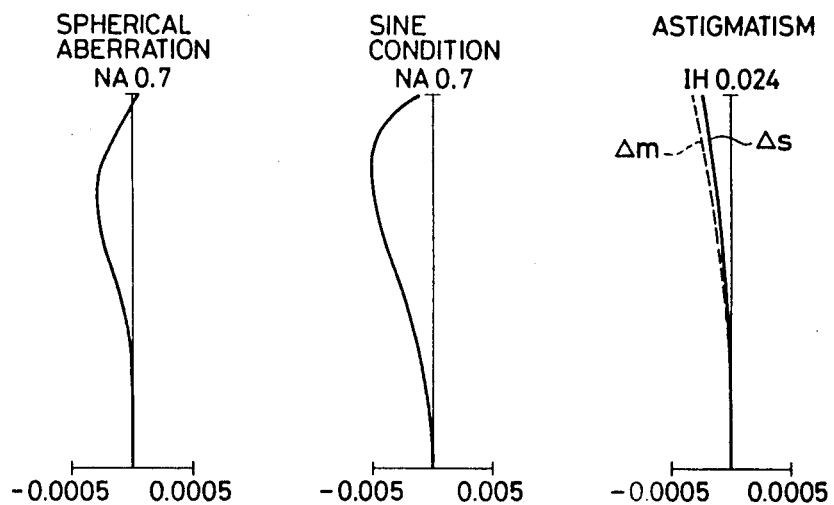
FIGS. 3 through 16, respectively, show graphs illustrating aberration curves of Embodiments 1 through 14 of the GRIN single lens system according to the present invention.
Figure 4:
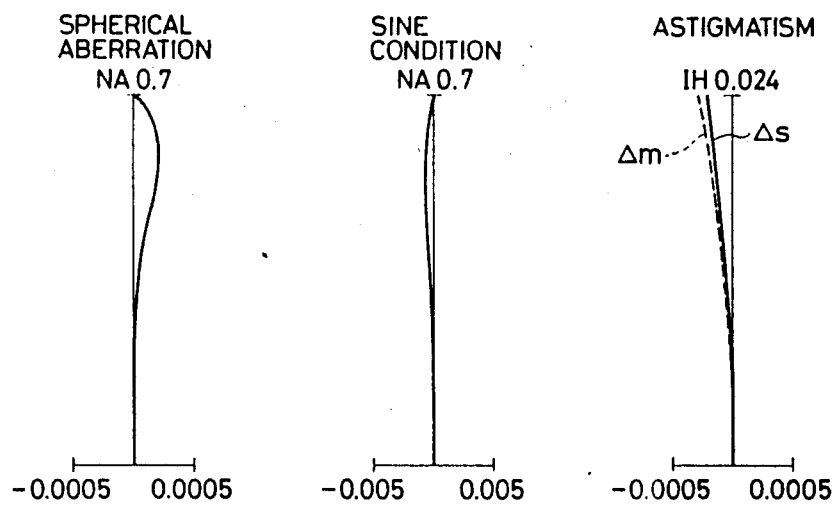
Figure 5:
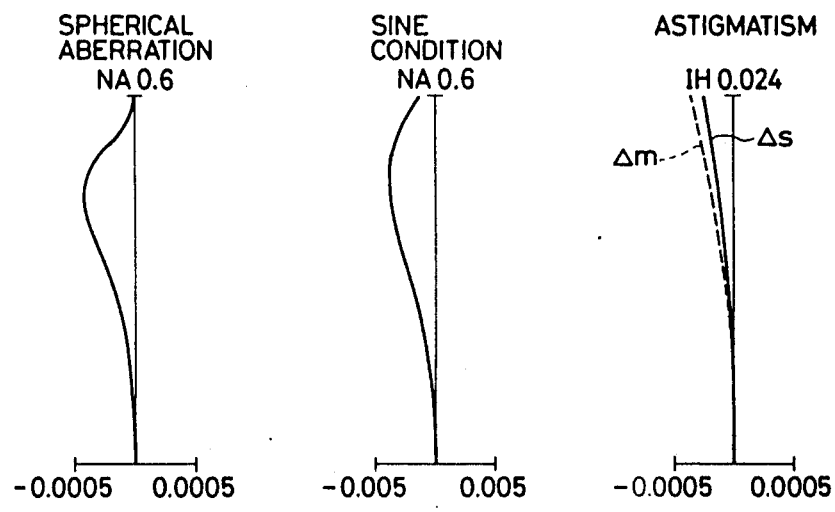
Figure 6:
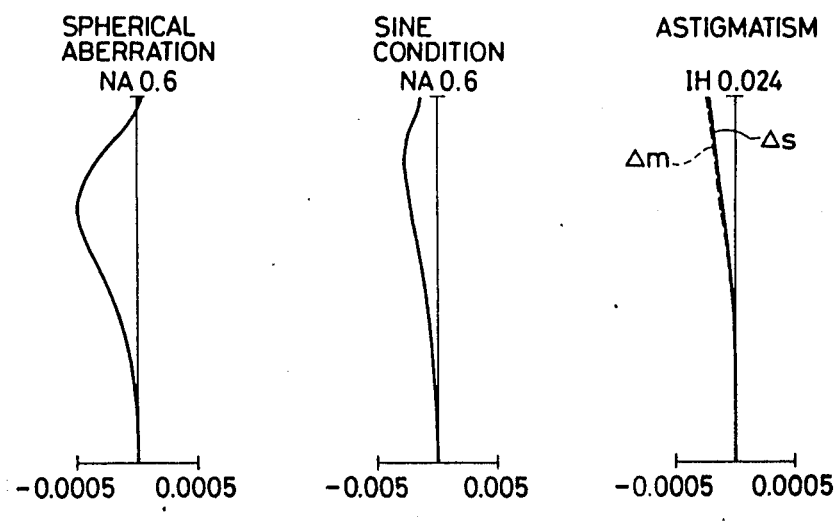
Figure 7:
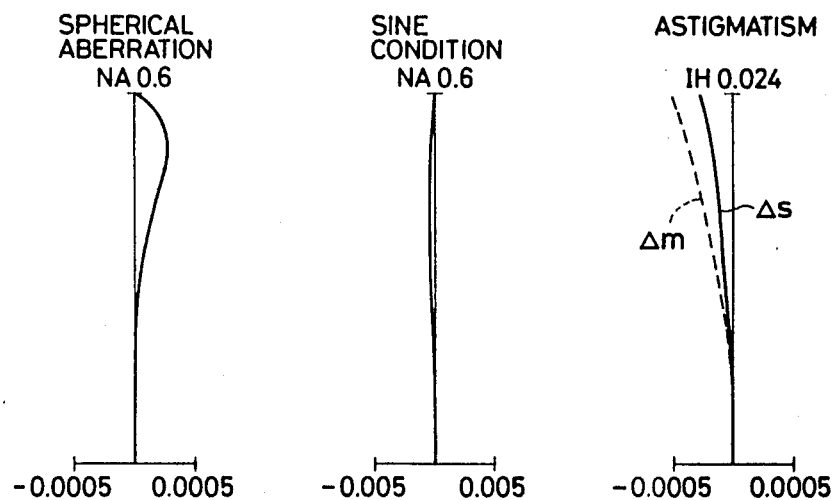
Figure 8:
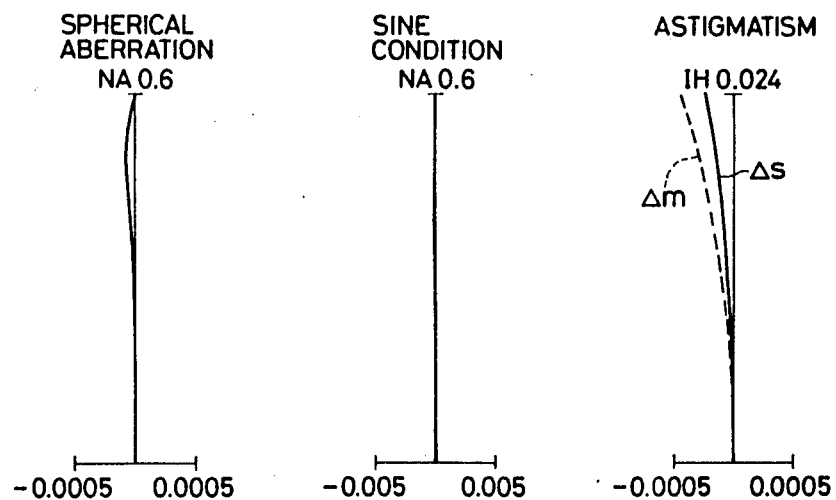
Figure 9:
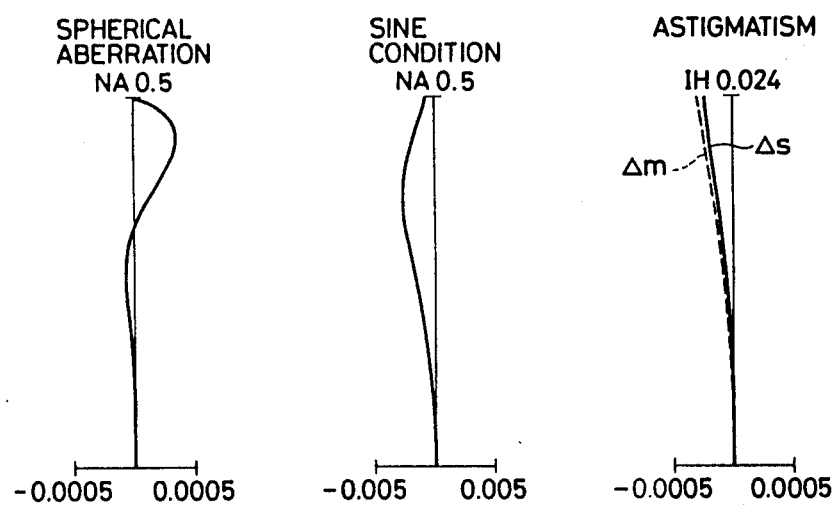
Figure 10:
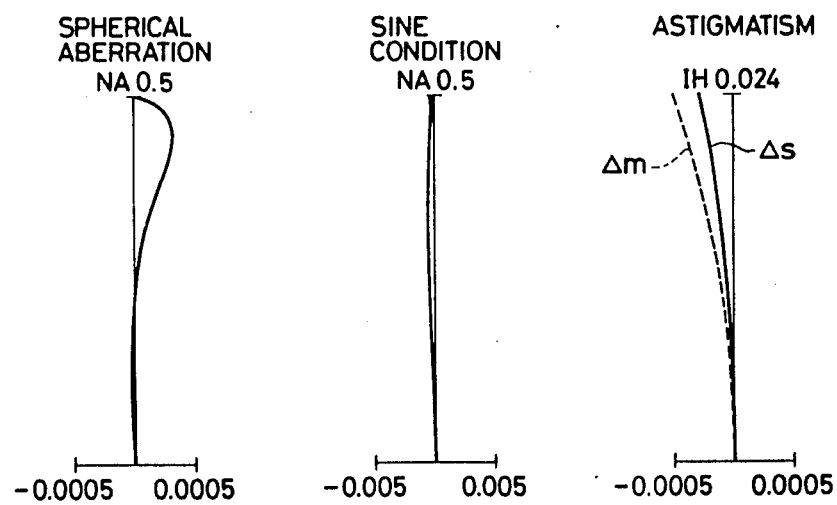
Figure 11:
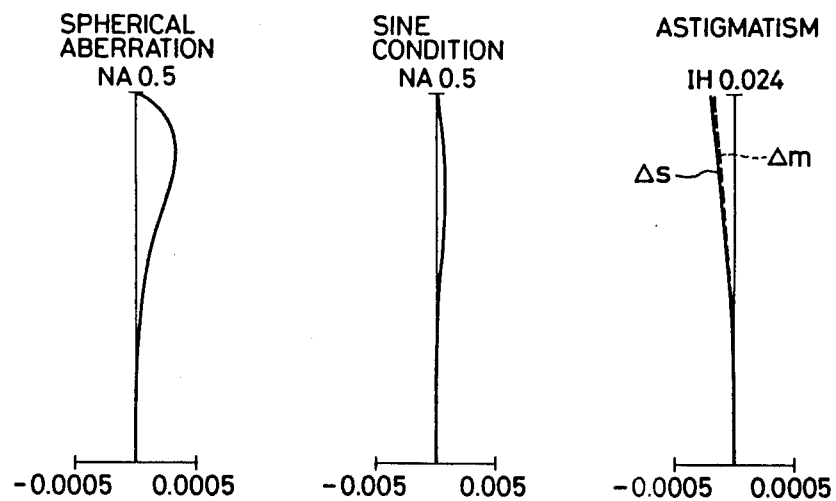
Figure 12:
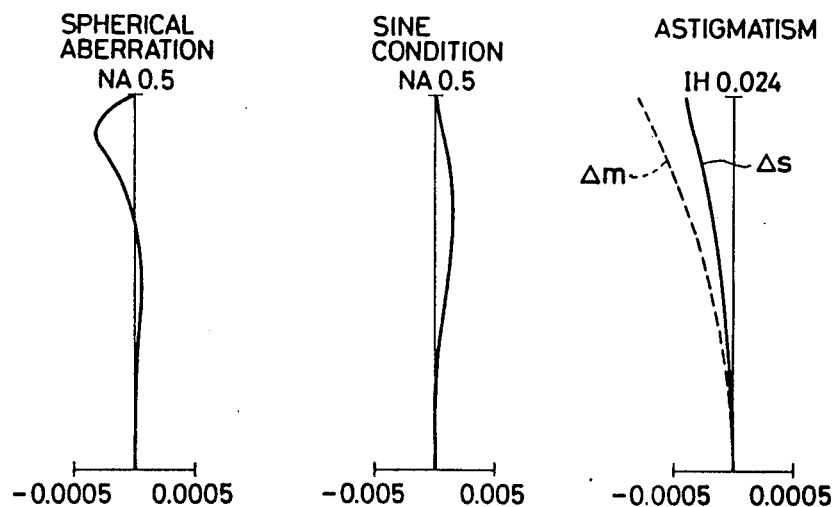
Figure 13:
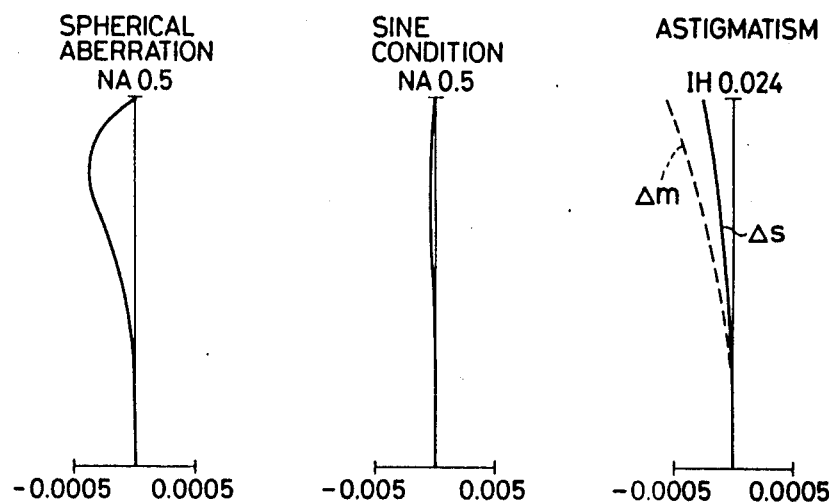
Figure 14:
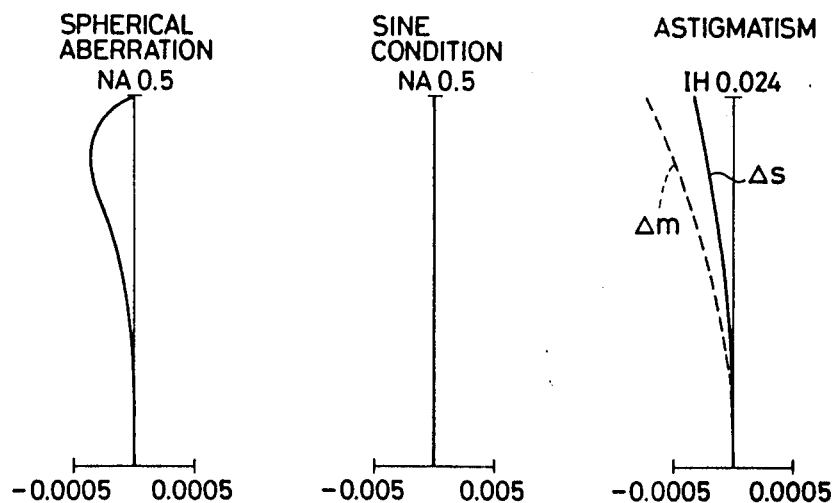
Figure 15:
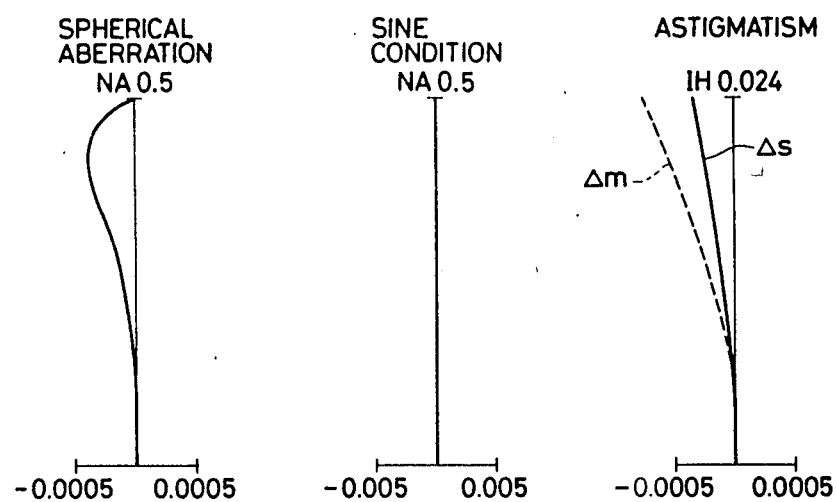
Figure 16:
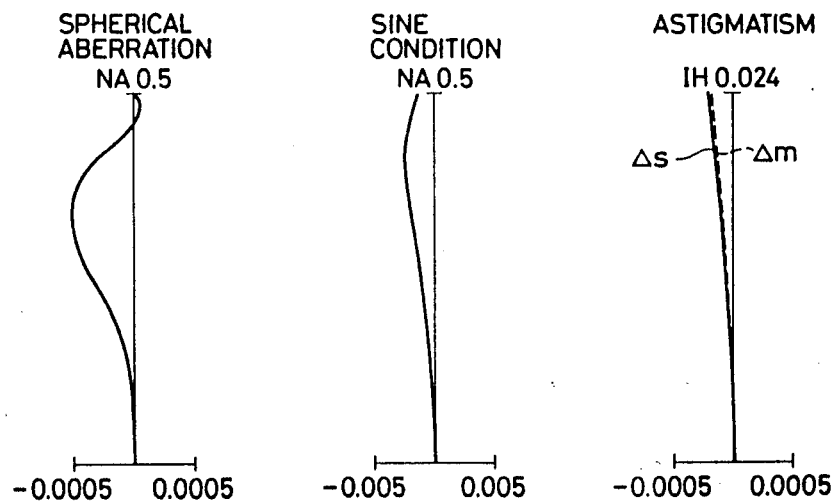

Each of the Embodiments of the GRIN single lens system according to the present invention utilizes inhomogeneous material wherein the refractive index distribution thereof is expressed by the following formula and the surfaces $R_1$, $R_2$ thereof are formed spherically as shown in FIG. 1 and FIG. 2.

$$n^2 = n_0^2[1 - (gr)^2 + h_4(gr)^4 + h_6(gr)^6 + h_8(gr)^8 + h_{10}(gr)^{10}]$$

Each Embodiment has the following numerical data:

Embodiment 1
$R_1 = 1.148$, $R_2 = -2.416$, $D = 1.44$, $n_0 = 1.65$
$g = 0.458$, $h_4 = 0.051$, $h_6 = 3.715$, $h_8 = 25.497$
$h_{10} = 303.03$, $f = 1.0$, $NA = 0.7$ Embodiment 2
$R_1 = 1.474$, $R_2 = -6.146$, $D = 1.68$, $n_0 = 1.65$
$g = 0.542$, $h_4 = -0.401$, $h_6 = -0.064$, $h_8 = 0.725$
$h_{10} = 0.199 \times 10^{-2}$, $f = 1.0$, $NA = 0.7$ Embodiment 3
$R_1 = 0.920$, $R_2 = -2.773$, $D = 1.20$, $n_0 = 1.65$
$g = 0.375$, $h_4 = 4.199$, $h_6 = 48.472$, $h_8 = 552.27$
$h_{10} = 9904.7$, $f = 1.0$, $NA = 0.6$ Embodiment 4
$R_1 = 1.590$, $R_2 = -1.332$, $D = 1.56$, $n_0 = 1.65$
$g = 0.458$, $h_4 = 1.264$, $h_6 = 6.116$, $h_8 = 115.36$
$h_{10} = 0.164$, $f = 1.0$, $NA = 0.6$ Embodiment 5
$R_1 = 0.917$, $R_2 = 8.330$, $D = 1.08$, $n_0 = 1.65$
$g = 0.500$, $h_4 = -0.543$, $h_6 = 0.528$, $h_8 = 9.230$
$h_{10} = 0.015$, $f = 1.0$, $NA = 0.6$ Embodiment 6
$R_1 = 1.191$, $R_2 = 1.963$, $D = 1.44$, $n_0 = 1.65$
$g = 0.583$, $h_4 = -0.742$, $h_6 = -1.004$, $h_8 = -1.465$
$h_{10} = -0.341 \times 10^{-2}$, $f = 1.0$, $NA = 0.6$ Embodiment 7
$R_1 = 0.952$, $R_2 = -1.343$, $D = 1.20$, $n_0 = 1.65$
$g = 0.250$, $h_4 = 53.307$, $h_6 = 1328.3$, $h_8 = 52358$
$h_{10} = 14.754$, $f = 1.0$, $NA = 0.5$ Embodiment 8
$R_1 = 0.831$, $R_2 = -26.298$, $D = 0.96$, $n_0 = 1.65$
$g = 0.417$, $h_4 = 2.374$, $h_6 = 28.892$, $h_8 = 460.17$
$h_{10} = 0.384$, $f = 1.0$, $NA = 0.5$ Embodiment 9
$R_1 = 2.876$, $R_2 = -1.241$, $D = 1.80$, $n_0 = 1.65$
$g = 0.500$, $h_4 = 1.232$, $h_6 = 4.005$, $h_8 = 15.651$
$h_{10} = 0.017$, $f = 1.0$, $NA = 0.5$ Embodiment 10
$R_1 = 0.741$, $R_2 = 15.040$, $D = 0.36$, $n_0 = 1.65$
$g = 0.542$, $h_4 = -0.677$, $h_6 = -0.814$, $h_8 = -57.893$
$h_{10} = -0.086$, $f = 1.0$, $NA = 0.5$ Embodiment 11
$R_1 = 1.138$, $R_2 = 1.216$, $D = 1.32$, $n_0 = 1.65$
$g = 0.625$, $h_4 = -0.753$, $h_6 = -1.412$, $h_8 = 2.649$
$h_{10} = 0.066$, $f = 1.0$, $NA = 0.5$ Embodiment 12
$R_1 = 0.923$, $R_2 = 2.032$, $D = 0.72$, $n_0 = 1.65$
$g = 0.708$, $h_4 = -0.970$, $h_6 = -1.778$, $h_8 = -3.194$
$h_{10} = -0.764 \times 10^{-2}$, $f = 1.0$, $NA = 0.5$ Embodiment 13
$R_1 = 0.957$, $R_2 = 1.710$, $D = 0.72$, $n_0 = 1.65$
$g = 0.750$, $h_4 = -0.842$, $h_6 = -1.280$, $h_8 = -1.308$
$h_{10} = -0.319 \times 10^{-2}$, $f = 1.0$, $NA = 0.5$ Embodiment 14
$R_1 = 1.753$, $R_2 = -0.982$, $D = 1.44$, $n_0 = 1.65$
$g = 0.375$, $h_4 = 8.898$, $h_6 = 70.914$, $h_8 = 1868.5$
$h_{10} = -2.900$, $f = 1.0$, $NA = 0.5$ where $R_1$ and $R_2$ respectively represent the radii of curvatures of the lens surfaces at the long conjugate side and at the short conjugate side, D represents the length of the lens, $n_0$ represents the refractive index on the optical axis of the lens, g is the parameter representing the degree of the gradient of the refractive index distribution, $h_4$, $h_6$, $h_8$ and $h_{10}$ respectively represent the higher order coefficients of the refractive index distribution, f represents the focal length of the lens, and NA represents the numerical aperture at the short conjugate side of the lens.

Each of Embodiments 1 thorugh 4, 7 through 9 and 14 of GRIN single lens system according to the present invention relates, as shown in FIG. 1, to a biconvex lens, and each of Embodiments 5, 6, 10 through 13 thereof relates, as shown in FIG. 2, to a positive meniscus lens.

For the design of each Embodiment of the GRIN single lens system according to the present invention, aberrations generated by the disk of which the thickness is 0.288 mm and the refractive index is 1.55 are taken into account. The values of $n_0$, g, $h_4$ through $h_{10}$ and the refractive index of the disk are for the wave length $\lambda = 780$ nm, and at this wave length aberrations become minimum. In this case, various aberrations of Embodiments 1 through 14 of the GRIN single lens system according to the present invention are shown in FIGS. 3 through 16.

As is mentioned above in detail and is evident from each preferred Embodiment, it is not only possible for the GRIN single lens system according to the present invention to have N.A. of no less than 0.5 while various aberrations are well-corrected, but also possible to have N.A. of no less than 0.7, which is extremely difficult in the usual lens design.

I claim:

1. A graded refractive index single lens system comprising at least one surface formed spherically, having refractive index n expressed by the formula shown below wherein $n_0$ represents the refractive index on the optical axis of said lens and r represents the radial distance from the optical axis, and satisfying the conditions (1) and (2) shown below:

$$n^2 = n_0^2[1-(gr)^2 + h_4(gr)^4 + h_6(gr)^6 + h_8(gr)^8 + h_{10}(gr)^{10}]$$

$$-1.5 < 1/h_8 < 2 \tag{1}$$

$$-5 < h_{10} \tag{2}$$

where g is a parameter representing the degree of the gradient of the refractive index distribuiton, and $h_4$, $h_6$, $h_8$ and $h_{10}$ respectively represent the higher order coefficients of said refractive index distribution.

2. A graded refractive index single lens system according to claim 1 wherein said graded refractive index single lens system has the following numerical data:

| | | | |
|---|---|---|---|
| $R_1 = 1.148$ | $R_2 = -2.416$ | $D = 1.44$ | $n_0 = 1.65$ |
| $g = 0.458$ | $h_4 = 0.051$ | $h_6 = 3.715$ | $h_8 = 25.497$ |
| $h_{10} = 303.03$ | | $f = 1.0$ | $NA = 0.7$ | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

3. A graded refractive index single lens system according to claim 1 wherein said graded refractive index single lens system has the following numerical data:

| | | | |
|---|---|---|---|
| $R_1 = 1.474$ | $R_2 = -6.146$ | $D = 1.68$ | $n_0 = 1.65$ |
| $g = 0.542$ | $h_4 = -0.401$ | $h_6 = 0.064$ | $h_8 = 0.725$ |
| $h_{10} = 0.199 \times 10^{-2}$ | | $f = 1.0$ | $NA = 0.7$ | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

4. A graded refractive index single lens system according to claim 1 wherein said graded refractive index single lens system has the following numerical data:

| | | | |
|---|---|---|---|
| $R_1 = 0.920$ | $R_2 = -2.773$ | $D = 1.20$ | $n_0 = 1.65$ |
| $g = 0.375$ | $h_4 = 4.199$ | $h_6 = 48.472$ | $h_8 = 552.27$ |
| $h_{10} = 9904.7$ | | $f = 1.0$ | $NA = 0.6$ | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

5. A graded refractive index single lens system according to claim 1 wherein said graded refractive index single lens system has the following numerical data:

| | | | |
|---|---|---|---|
| $R_1 = 1.590$ | $R_2 = -1.332$ | $D = 1.56$ | $n_0 = 1.65$ |
| $g = 0.458$ | $h_4 = 1.264$ | $h_6 = 6.116$ | $h_8 = 115.36$ |
| $h_{10} = 0.164$ | | $f = 1.0$ | $NA = 0.6$ | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

6. A graded refractive index single lens system according to claim 1 wherein said graded refractive index single lens system has the following numerical data:

| | | | |
|---|---|---|---|
| $R_1 = 0.917$ | $R_2 = 8.330$ | $D = 1.08$ | $n_0 = 1.65$ |
| $g = 0.500$ | $h_4 = -0.543$ | $h_6 = 0.528$ | $h_8 = 9.230$ |
| $h_{10} = 0.015$ | | $f = 1.0$ | $NA = 0.6$ | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

7. A graded refractive index single lens system according to claim 1 wherein said graded refractive index single lens system has the following numerical data:

| | | | |
|---|---|---|---|
| $R_1 = 1.191$ | $R_2 = 1.963$ | $D = 1.44$ | $n_0 = 1.65$ |
| $g = 0.583$ | $h_4 = -0.742$ | $h_6 = -1.004$ | $h_8 = -1.465$ |
| $h_{10} = -0.341 \times 10^{-2}$ | | $f = 1.0$ | $NA = 0.6$ | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

8. A graded refractive index single lens system according to claim 1 wherein said graded refractive index single lens system has the following numerical data:

| | | | |
|---|---|---|---|
| $R_1 = 0.952$ | $R_2 = -1.343$ | $D = 1.20$ | $n_0 = 1.65$ |
| $g = 0.250$ | $h_4 = 53.307$ | $h_6 = 1328.3$ | $h_8 = 52358$ |
| $h_{10} = 14.754$ | | $f = 1.0$ | $NA = 0.5$ | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

9. A graded refractive index single lens system according to claim 1 wherein said graded refractive index single lens system has the following numerical data:

| | | | |
|---|---|---|---|
| $R_1 = 0.831$ | $R_2 = -26.298$ | $D = 0.96$ | $n_0 = 1.65$ |

-continued

| | | | |
|---|---|---|---|
| g = 0.417 | $h_4$ = 2.374 | $h_6$ = 28.892 | $h_8$ = 460.17 |
| $h_{10}$ = 0.384 | | f = 1.0 | NA = 0.5 | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

10. A graded refractive index single lens system according to claim 1 wherein said graded refractive index single lens system has the following numerical data:

| | | | |
|---|---|---|---|
| $R_1$ = 2.876 | $R_2$ = −1.241 | D = 1.80 | $n_0$ = 1.65 |
| g = 0.500 | $h_4$ = 1.232 | $h_6$ = 4.005 | $h_8$ = 15.651 |
| $h_{10}$ = 0.017 | | f = 1.0 | NA = 0.5 | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

11. A graded refractive index single lens system according to claim 1 wherein said graded refractive index single lens system has the following numerical data:

| | | | |
|---|---|---|---|
| $R_1$ = 0.741 | $R_2$ = 15.040 | D = 0.36 | $n_0$ = 1.65 |
| g = 0.542 | $h_4$ = −0.677 | $h_6$ = −0.814 | $h_8$ = −57.893 |
| $h_{10}$ = −0.086 | | f = 1.0 | NA = 0.5 | wherein $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

12. A graded refractive index single lens system according to claim 1 wherein said graded refractive index single lens system has the following numerical data:

| | | | |
|---|---|---|---|
| $R_1$ = 1.138 | $R_2$ = 1.216 | D = 1.32 | $n_0$ = 1.65 |
| g = 0.625 | $h_4$ = −0.753 | $h_6$ = −1.412 | $h_8$ = 2.649 |
| $h_{10}$ = 0.066 | | f = 1.0 | NA = 0.5 | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

13. A graded refractive index single lens system according to claim 1 wherein said graded refractive index single lens system has the following numerical data:

| | | | |
|---|---|---|---|
| $R_1$ = 0.923 | $R_2$ = 2.032 | D = 0.72 | $n_0$ = 1.65 |
| g = 0.708 | $h_4$ = −0.970 | $h_6$ = −1.778 | $h_8$ = −3.194 |
| $h_{10}$ = −0.764 × $10^{-2}$ | | f = 1.0 | NA = 0.5 | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

14. A graded refractive index single lens system according to claim 1 wherein said graded refractive index single lens system has the following numerical data:

| | | | |
|---|---|---|---|
| $R_1$ = 0.957 | $R_2$ = 1.710 | D = 0.72 | $n_0$ = 1.65 |
| g = 0.750 | $h_4$ = −0.842 | $h_6$ = −1.280 | $h_8$ = −1.308 |
| $h_{10}$ = −0.319 × $10^{-2}$ | | f = 1.0 | NA = 0.5 | where $R_1$ and $R_2$ respectively represent the radii of curvatures of said lens surfaces at the long conjugate side and at the short conjugate side, D represents the length of the lens, f represents the focal length of said lens, and NA represents the numerical aperture at the short conjugate side of said lens.

15. A graded refractive index single lens system according to claim 1 wherein said graded refractive index single lens system has the following numerical data:

| | | | |
|---|---|---|---|
| $R_1$ = 1.753 | $R_2$ = −0.982 | D = 1.44 | $n_0$ = 1.65 |
| g = 0.375 | $h_4$ = 8.898 | $h_6$ = 70.914 | $h_8$ = 1868.5 |
| $h_{10}$ = −2.900 | | f = 1.0 | NA = 0.5 | where $R_1$ and $R_2$ respectively represent the radii of curvatures of said lens surfaces at the long conjugate side and at short conjugate side, D represents the length of the lens, f represents the focal length of said lens, and NA represents the numerical aperture at the short conjugate side of said lens.

* * * * *